US009126671B2

(12) United States Patent
Dubost et al.

(10) Patent No.: US 9,126,671 B2
(45) Date of Patent: Sep. 8, 2015

(54) STIFF PANEL FOR AIRCRAFT, COMPRISING STIFFENERS WITH NOTCHED CORES

(75) Inventors: Jéôme Dubost, La Salvetat Saint Gilles (FR); Jean Claude Lacombe, Blagnac (FR)

(73) Assignee: Airbus Operations S.A.S. (FR)

( * ) Notice: Subject to any disclaimer, the term of this patent is extended or adjusted under 35 U.S.C. 154(b) by 430 days.

(21) Appl. No.: 13/557,390

(22) Filed: Jul. 25, 2012

(65) Prior Publication Data

US 2013/0026292 A1 Jan. 31, 2013

(30) Foreign Application Priority Data

Jul. 27, 2011 (FR) ..................................... 11 56855

(51) Int. Cl.

| | |
|---|---|
| ***B64C 1/12*** | (2006.01) |
| ***B64C 1/06*** | (2006.01) |
| ***E04C 2/32*** | (2006.01) |
| ***B64C 3/18*** | (2006.01) |
| *B64C 1/00* | (2006.01) |

(52) U.S. Cl.

CPC . *B64C 1/12* (2013.01); *B64C 1/064* (2013.01); *B64C 3/182* (2013.01); *E04C 2/324* (2013.01); *B64C 2001/0072* (2013.01); *Y02T 50/433* (2013.01); *Y10T 428/24174* (2015.01); *Y10T 428/24182* (2015.01)

(58) Field of Classification Search

USPC ........... 244/117 R, 119, 123.1; 428/119, 120; 52/801.1, 630

See application file for complete search history.

(56) References Cited

U.S. PATENT DOCUMENTS

| | | | | |
|---|---|---|---|---|
| 4,380,573 | A * | 4/1983 | Naslund | 428/595 |
| 4,635,882 | A * | 1/1987 | SenGupta et al. | 244/119 |
| 5,021,279 | A * | 6/1991 | Whitener | 428/100 |
| 5,577,688 | A * | 11/1996 | Sloan | 244/117 R |
| 5,600,928 | A * | 2/1997 | Hess et al. | 52/309.4 |
| 5,779,193 | A * | 7/1998 | Sloan | 244/117 R |
| 5,803,402 | A * | 9/1998 | Krumweide et al. | 244/117 R |
| 5,899,412 | A * | 5/1999 | Dilorio et al. | 244/119 |
| 6,114,012 | A * | 9/2000 | Amaoka et al. | 428/182 |
| 6,708,459 | B2 * | 3/2004 | Bodnar | 52/356 |
| 6,948,684 | B2 * | 9/2005 | Beral et al. | 244/119 |
| 7,914,223 | B2 * | 3/2011 | Wood et al. | 403/232.1 |
| 8,016,234 | B2 * | 9/2011 | Muller et al. | 244/119 |
| 8,302,909 | B2 * | 11/2012 | Cazeneuve et al. | 244/120 |
| 8,684,309 | B2 * | 4/2014 | Wildman | 244/123.1 |
| 2004/0040252 | A1 * | 3/2004 | Beral et al. | 52/729.3 |
| 2005/0247818 | A1 | 11/2005 | Prichard et al. | |
| 2007/0138695 | A1 * | 6/2007 | Krogager et al. | 264/259 |
| 2009/0078823 | A1 * | 3/2009 | Wood et al. | 244/119 |
| 2010/0282903 | A1 * | 11/2010 | Gauthie et al. | 244/119 |
| 2011/0147522 | A1 * | 6/2011 | Williams | 244/123.1 |
| 2011/0174923 | A1 | 7/2011 | Dervault | |
| 2012/0104166 | A1 * | 5/2012 | Pina Lopez et al. | 244/119 |

FOREIGN PATENT DOCUMENTS

WO 2010012913 A1 2/2010

* cited by examiner

*Primary Examiner* — Joseph W Sanderson

(74) *Attorney, Agent, or Firm* — Lerner, David, Littenberg, Krumholz & Mentlik, LLP

(57) ABSTRACT

A stiffened panel includes a panel at least one of whose surfaces is equipped with stiffeners each of which includes a base that is pressed against the surface of panel, as well as a core that is oriented orthogonally relative to the base and whose first longitudinal edge is integral to the latter. At least one of the stiffeners includes a multitude of notches that cross over a second longitudinal edge of the core opposite the first edge, so that they extend towards the outside of the stiffener.

8 Claims, 2 Drawing Sheets

STIFF PANEL FOR AIRCRAFT, COMPRISING STIFFENERS WITH NOTCHED CORES

FIELD OF THE INVENTION

This invention relates to the field of stiffened panels, preferably those made of a composite material.

BACKGROUND OF THE INVENTION

These types of panels, which fulfill a structural function, are used in a great many technical fields, such as aeronautics and in automobiles. In particular, they are used to strengthen the resistance of a thin panel to buckling. Their quantity and shape are determined so as to obtain the best possible compromise in terms of mechanical resistance and mass.

In particular, the use of stiffeners with a T-shaped cross-section for stiffening a panel is known. In this case, the base is affixed and pressed against one surface of the panel, and the core is oriented orthogonally to the base.

There are situations in which the height of the core must be increased, for example when required to attach parts or equipment in the distal part of the core, near its longitudinal edge opposite to the one that is integral to the base. Another function resides in the fact of creating, using the distal parts of the cores of the stiffeners, a physical barrier that is as far away as possible from the panel bearing the stiffeners, for the purpose, in particular, of limiting impacts on this panel, between the stiffeners.

In these circumstances, the core of the stiffener may have a cross-section that is disproportionately slender and which adversely affects its resistance to buckling, and which therefore adversely affects the overall resistance of the stiffened panel, when it is stressed in this manner. The compromise of mechanical resistance vs. mass then becomes inefficient.

BRIEF SUMMARY OF THE INVENTION

The purpose of the invention, therefore, is to at least partially remedy the drawbacks mentioned above, as compared to the embodiments of the prior art.

An exemplary embodiment of the invention is a stiffened panel comprising a panel at least one of whose surfaces is equipped with stiffeners, each of which comprises a base that is pressed against the panel's surface, as well as a core that is oriented orthogonally relative to the base and of which a first longitudinal edge is integral with the latter.

According to an embodiment of the invention, at least one of the stiffeners comprises a multitude of notches that cross a second longitudinal edge of the core opposite the first edge, so that they extend towards the outside of the stiffener.

In this way, when the stiffened panel is subjected to a buckling-type means of stress, the compression forces circulate around the core of the stiffener in only one part of the section, namely, the one that does not have the notch. This reduces the actual narrowing of the cross-section of the core in this manner of stress, and consequently increases the stiffener's resistance to buckling.

The invention offers a clever solution, one that offers a satisfactory compromise in terms of resistance to buckling and mass, while preserving, between the notched parts, an increased core height that could be used for various purposes, such as the one indicated above.

Preferably, each notch has a height "h", and the distance between two directly consecutive notches is less than or equal to seven times the value of height "h". By applying this mathematical relationship, when the stiffened panel is subject to a buckling-type method of stress, the compression forces are located in this section located under the notches of the core of the stiffener. Thus these compression forces in fact circulate only in the longitudinal direction, according to which the fibers are preferably oriented when the stiffener is made of composite material.

Preferably, the notches are distributed evenly along the longitudinal direction of the core, even if it could be done otherwise, without deviating from the scope of the invention.

Preferably, each notch is of a height that enables the stiffener to provide the stabilizing function for which it is installed, without causing significant loss of force. Typical values for a notch height are defined so that the unnotched part of the core of the stiffener has a height on the order of eight times the thickness.

Preferably, each notch is straight or semi-circular in shape. These shapes are especially easy to produce, by simply machining a straight core. Nevertheless, other shapes can of course be considered, without deviating from the scope of the invention.

Preferably, each stiffener has a cross-section in the shape of a T. However, the core could have a second base at the level of its second longitudinal edge, without deviating from the scope of the invention. In such a case, the notches would also cross this second base.

Preferably, the panel and/or its stiffeners are made of a composite material comprising glass and/or carbon fibers mixed with a resin.

Another embodiment of the invention is a landing gear case that comprises at least one stiffened panel as defined above.

Finally, another object of the invention is an aircraft that comprises this type of landing gear case or undercarriage.

Other advantages and characteristics of the invention will appear in the non-limiting detailed description below.

BRIEF DESCRIPTION OF THE DRAWINGS

This description will be given in reference to the attached drawings, among which.

DETAILED DESCRIPTION

Figure 1:
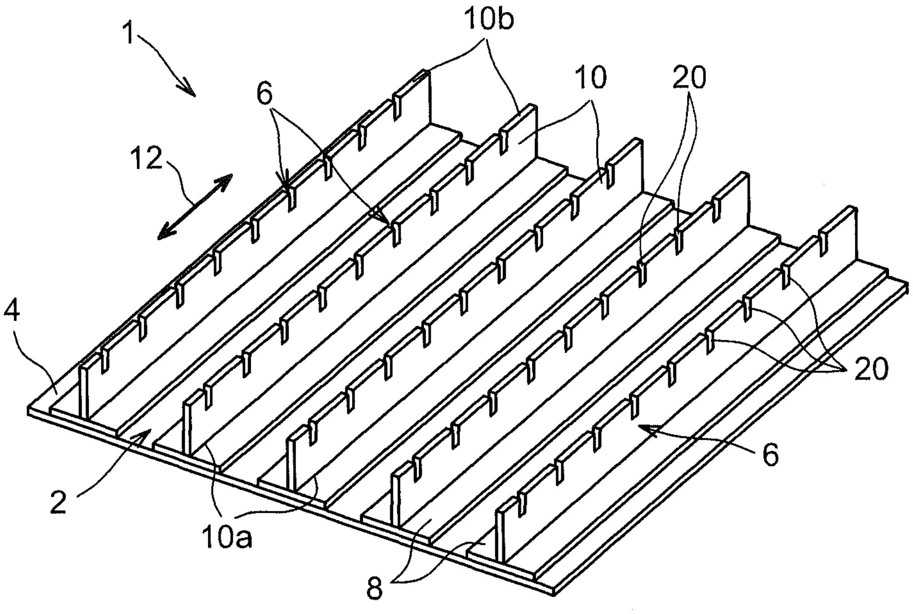
FIG. 1 shows a perspective view of a stiffened panel according to a preferred embodiment of the present invention.
Figure 2:
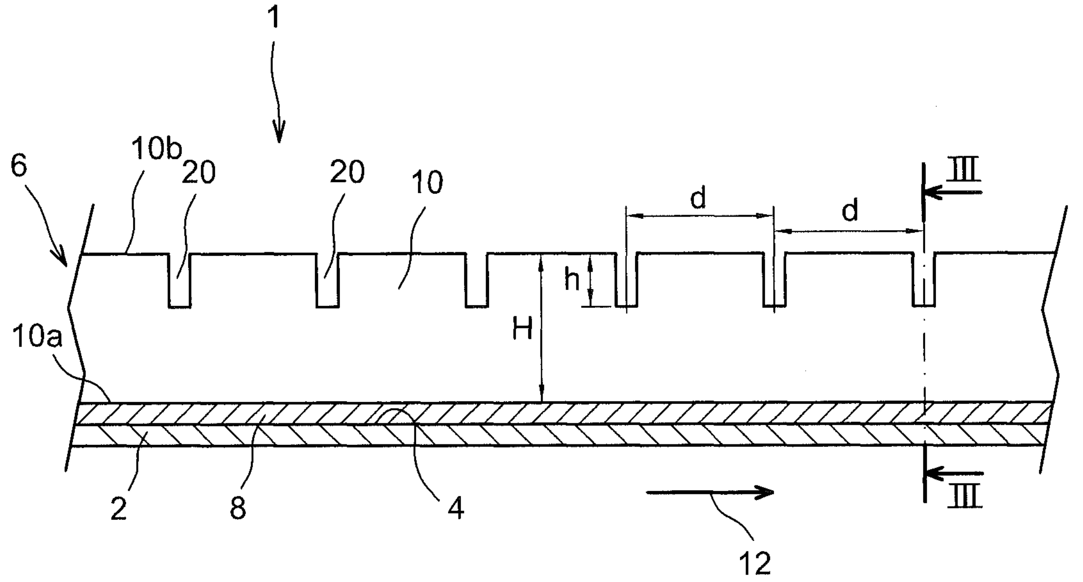
FIG. 2 shows a section view through line II-II of FIG. 3.
Figure 3:
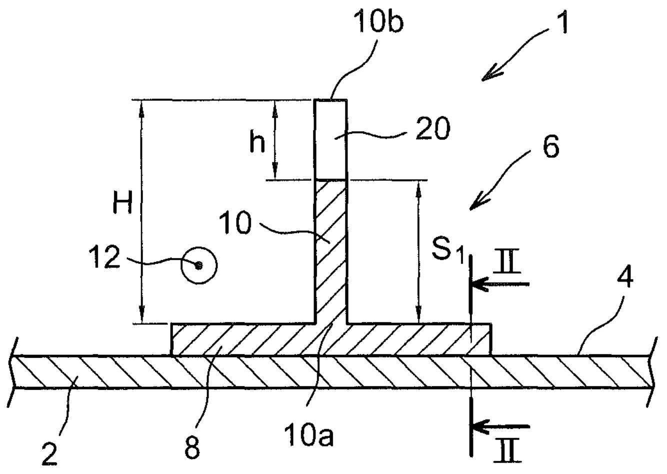
FIG. 3 shows a section view through line III-III of FIG. 2.

In reference to FIGS. 1 through 3, a stiffened panel 1, designed to serve a structural function, is shown according to a preferred embodiment of the invention.

This stiffened panel 1 is preferably designed to form a landing gear case for an aircraft, in which landing gear case the landing gear is housed during the cruise phase of the aircraft. This type of landing gear case may be plane-parallel or similar in shape, with one or more of its sides then consisting of one or more stiffened panels.

Stiffened panel 1 comprises a panel 2, preferably flat, and made of a composite material comprising glass and/or carbon fibers mixed with a resin, for example epoxy resin. Its surface area may be as much as several square meters, and it may be very thin, on the order of only a few millimeters, for example less than 3 mm.

Panel 2 has two opposing surfaces, of which at least one is outfitted with stiffeners. This way, in FIG. 1, we can see that the upper surface 4 of panel 2 has linear stiffeners 6 fastened to it. Here the stiffeners are arranged parallel to each other, and have an inverted T cross section.

Effectively, each stiffener 6 comprises a base 8 that forms the head of the T, which is pressed against and attached to surface 4, and is oriented parallel to it. It is affixed preferably by gluing. Also, stiffener 6 comprises a core 10 that is oriented orthogonally to base 8, and which is integral with the latter. The two components 8, 10 may for example be used in a single piece, or else, alternatively attached to each other.

The parts are joined at a first longitudinal edge 10*a* of core 10, which extends along a longitudinal direction 12.

Each stiffener 6 is made preferably of a composite material consisting of glass and/or carbon fibers mixed with a resin, for example epoxy resin. The direction of the fibers preferably corresponds with the longitudinal direction 12.

In an exemplary embodiment, notches 20 are made in second longitudinal edge 10*b* of core 10, opposite to the first longitudinal edge 10*a*. More precisely, each notch 20 is made through the entire thickness of core 10, in the upper part of the core, and extends in the direction opposite that in which panel 2 is located, until it crosses the second edge 10*b*. Therefore it extends outwards from the stiffener, upwards in the illustrations.

Notches 20 are preferably distributed evenly along direction 12, and have identical shapes and dimensions. Here, every notch 20 is straight and is orthogonal to surface 4 of panel 2. It extends over a height "h" that corresponds to a fraction of the total height "H" of the core. It should preferably be made so that the non-notched part of the core of the stiffener has a height "H–h" on the order of about eight times the thickness.

Typically, the thickness of the core and of the base of the stiffener is identical or similar to that of panel 2 onto which it is attached.

Also, when stiffened panel 1 is being subjected to buckling stresses, in order to allow for very satisfactory confinement of the compression forces in the part of the section of the core that is located underneath the notches, the distance "d" between any two directly consecutive notches 20 along direction 12, is less than or equal to seven times the value of height "h" of these notches 20.

The part of the actual cross-section of the core that works in this manner of buckling stress is referenced as S1 in FIG. 3. It is of a height that is less than the overall height "H" of the core, which allows its actual narrowing to be reduced in this stress mode, and consequently increase the stiffener's resistance to buckling.

Figure 4:
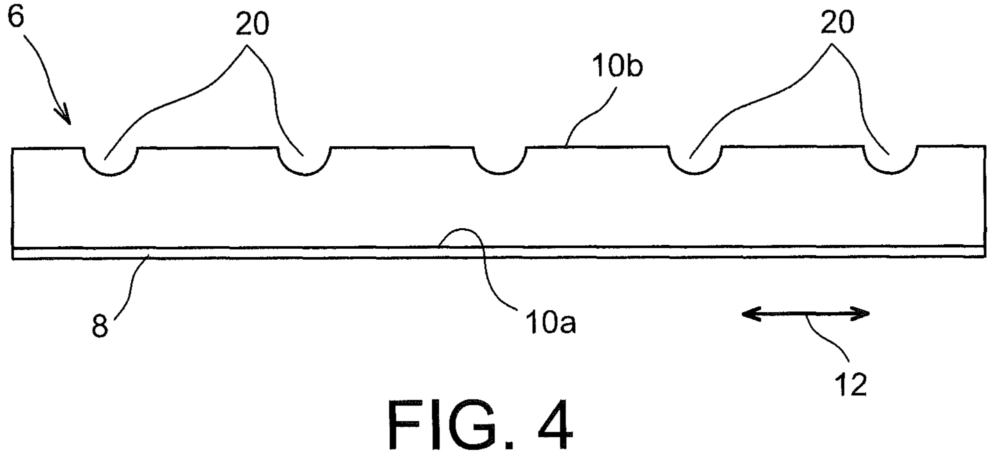
FIG. 4 shows a side view of a stiffener according to one alternative embodiment, intended to outfit the stiffened panel shown in FIG. 1.

FIG. 4 shows an alternative embodiment for stiffeners 6, in which the notches are semi-circular in shape.

Of course, various modifications may be made by the skilled craftsman to the invention described above, which is given solely as a non-limiting example. In particular, the shape of notches 20 may be adapted to the requirements encountered.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A stiffened panel comprising:

a panel; and a plurality of stiffeners on at least one surface of the panel;

wherein each stiffener comprises:

a base pressed against the at least one surface of the panel; and a planar core oriented orthogonally relative to the base and having a first and a second longitudinal edge at a first end and a second end, respectively, wherein the first longitudinal edge of the planar core at the first end is integral to the base and the second longitudinal edge at the second end is distal from the base and is free; and wherein at least one of the stiffeners comprises a plurality of notches defined along the free second longitudinal edge of the planar core such that each of the plurality of notches extends from the free second longitudinal edge into the planar core towards the base.

2. The stiffened panel according to claim 1, wherein each notch has a height "h", and wherein a distance "d" between two directly consecutive notches is less than or equal to seven times the value of height "h".

3. The stiffened panel according to claim 1, wherein the notches are distributed evenly along the longitudinal direction of the planar core.

4. The stiffened panel according to claim 1, wherein each notch is straight or semi-circular in shape.

5. The stiffened panel according to claim 1, wherein each stiffener has a T-shaped cross-section.

6. The stiffened panel according to claim 1, wherein at least one of the panel and the stiffeners are made of a composite material comprising at least one of fiberglass and carbon fibers mixed with a resin.

7. A landing gear case comprising at least one stiffened panel, the stiffened panel comprising:

a panel; and a plurality of stiffeners on at least one surface of the panel;

wherein each stiffener comprises:

a base pressed against the at least one surface of the panel; and a planar core oriented orthogonally relative to the base and comprising a first and a second longitudinal edge at a first end and a second end, respectively, wherein the first longitudinal edge of the planar core at the first end is integral to the base and the second longitudinal edge at the second end is distal from the base and is free; and wherein at least one of the stiffeners comprises a plurality of notches defined along the free second longitudinal edge of the planar core such that each of the plurality of notches extends from the free second longitudinal edge into the planar core towards the base.

8. An aircraft comprising a landing gear case, the landing gear case comprising at least one stiffened panel, the at least one stiffened panel comprising:

a panel; and a plurality of stiffeners on at least one surface of the panel;

wherein each stiffener comprises:

a base pressed against the at least one surface of the panel; and a planar core oriented orthogonally relative to the base and having a first and a second longitudinal edge at a first end and a second end, respectively, wherein the first longitudinal edge of the planar core at the first end is integral to the base and the second longitudinal edge at the second end is distal from the base and is free; and wherein at least one of the stiffeners comprises a plurality of notches defined along the free second longitudinal edge of the planar core such that each of the plurality of notches extends from the free second longitudinal edge into the planar core towards the base.

* * * * *

UNITED STATES PATENT AND TRADEMARK OFFICE

CERTIFICATE OF CORRECTION

PATENT NO. : 9,126,671 B2
APPLICATION NO. : 13/557390
DATED : September 8, 2015
INVENTOR(S) : Jérôme Dubost et al.

It is certified that error appears in the above-identified patent and that said Letters Patent is hereby corrected as shown below:

On The Title Page, (75) Inventors:, "Jéôme" should read --Jérôme--.

Signed and Sealed this
Ninth Day of February, 2016

Michelle K. Lee
*Director of the United States Patent and Trademark Office*